Patented Apr. 23, 1940

2,198,298

UNITED STATES PATENT OFFICE 2,198,298

ACID DYESTUFFS AND A PROCESS OF PREPARING THEM

Paul Wolff and Friedrich Heim, Frankfort-on-the-Main, Germany, assignors to General Aniline & Film Corporation, a corporation of Delaware No Drawing. Application April 15, 1938, Serial No. 202,359. In Germany May 11, 1933

4 Claims. (Cl. 260—319)

The present invention relates to acid dyestuffs and to a process of preparing them.

This application is a continuation-in-part to application Ser. No. 725,007, filed May 10, 1934, in the name of Paul Wolff and Friedrich Heim for "Acid dyestuffs and a process of preparing them".

We have found that dyestuffs of very good fastness to light are obtainable by condensing 1 mol of a para-halogen-benzaldehyde, for instance, para-chloro- or -bromo-benzaldehyde, or 1 mol of para-sulfobenzaldehyde with 2 mols of an alpha-alkyl- or alpha-aryl-indole unsubstituted in the beta-position or an N-alkyl, for instance N-methyl- or N-ethyl-, derivative thereof, sulfonating the leuco compound thus obtained, oxidizing the sulfonated leuco compound and exchanging the halogen in para-position or the sulfo group in para-position by melting the dyestuff with a primary para-alkoxy-arylamine or a primary para-aryloxy-arylamine. The process may also consist in condensing one of the said aldehydes with a sulfonic acid of an alpha-alkyl- or alpha-aryl-indole unsubstituted in the beta-position or an N-alkyl, for instance N-methyl- or N-ethyl-, derivative thereof, oxidizing and, as stated above, further condensing with a primary para-alkoxy-arylamine or para-aryloxy-arylamine.

The dyestuffs obtained by this process are new. There are obtained, for instance, dyestuffs of the probable formula:

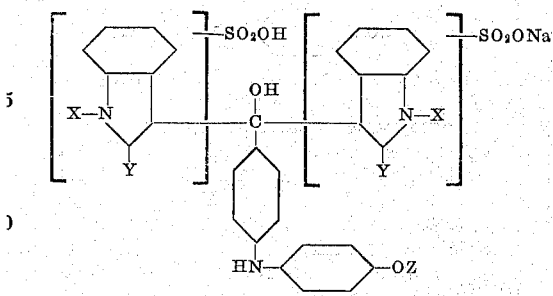

wherein X means hydrogen or a lower alkyl group, Y means a lower alkyl group or an aryl group and Z means a lower alkyl group or an aryl group.

The position of the two sulfo groups is not known. It must be supposed that they are present either in the benzene nucleus of the indole radical or in the substituent Y in case Y is an aryl radical.

The following examples serve to illustrate the invention, but they are not intended to limit it thereto:

(1) 1 mol of para-chlorobenzaldehyde is condensed with 2 mols of N-methyl-alpha-phenylindole in boiling alcohol with addition of a small quantity of hydrochloric acid. The scarcely soluble leuco compound which separates quantitatively is isolated and then dissolved in sulfuric acid monohydrate and sulfonated at ordinary temperature with fuming sulfuric acid containing 20% of sulfuric anhydride until a test portion has become soluble in sodium carbonate solution. The reaction mass is poured on ice and the leuco acid thus precipitated is isolated and dissolved in sodium carbonate solution, acidified with sulfuric acid and oxidized at room temperature with sodium bichromate solution. The dyestuff is salted out, dried and melted, at about 120° C., for several hours, for instance 4 to 6 hours, with an excess of para-phenetidine. The blue dyestuff thus obtained has probably the following constitution:

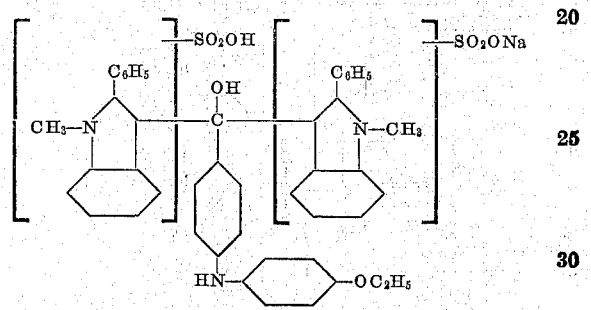

$C_{45}H_{36}N_3S_2O_7Na$ (molecular weight: 817)

It dyes in the form of its sodium salt wool and silk clear blue tints of excellent fastness to light.

The dyestuff dissolves in concentrated sulfuric acid to a violet solution. The values found by analysis for the dyestuff free from salt are the following: C=65.81%; H=4.67%; N=5.37%; S=7.57%; Na=2.71%. They confirm the above formula supposed for the dyestuff.

(2) 1 mol of para-sulfobenzaldehyde is condensed with 2 mols of N-methyl-alpha-phenyl-indole-sulfonic acid by heating the compounds in the presence of water on a water-bath at a temperature of about 95° C. for several hours, for instance 10 to 12 hours. The solution of the leuco compound thus obtained is acidified with sulfuric acid and oxidized at room temperature with an alkali bichromate solution. The red-violet dyestuff thus obtained is salted out and isolated in the form of its sodium salt and is heated for several hours, for instance 4 to 6 hours, at about 120° C. with an excess of para-anisidine.

The dyestuff thus obtained has probably the following constitution:

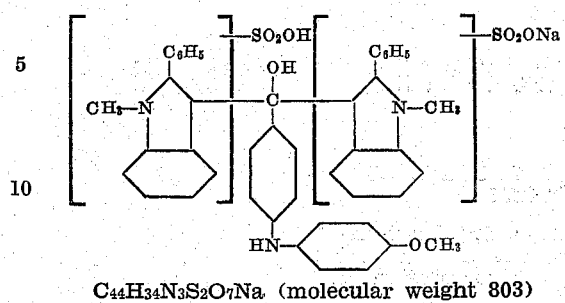

C₄₄H₃₄N₃S₂O₇Na (molecular weight 803)

It dyes wool and silk clear blue tints of excellent fastness to light. It dissolves in concentrated sulfuric acid to a violet-red solution. The values found by analysis for the dyestuff free from salt are: C=65.43%; H=4.67%; N=5.48%; S=7.72%; Na=3.02%. They confirm the above formula supposed for the dyestuff.

The N-methyl-alpha-phenyl-indole-sulfonic acid used as parent material may be obtained by causing 5 parts of fuming sulfuric acid containing 20 per cent. of sulfuric anhydride to act, at room temperature for about 4–5 hours, upon 1 part of N-methyl-alpha-phenyl-indole and separating the acid obtained in known manner, for instance in the form of its sodium salt.

(3) By substituting in Example 2 for the N-methyl-alpha-phenylindole-sulfonic acid the N-methyl-alpha-methyl-indole-sulfonic acid, which may be prepared in a manner similar to that described at the end of Example 2, and otherwise proceeding in the manner described in Example 2, a dyestuff is obtained which dyes wool and silk clear reddish blue tints of excellent fastness to light. It has probably the following constitution:

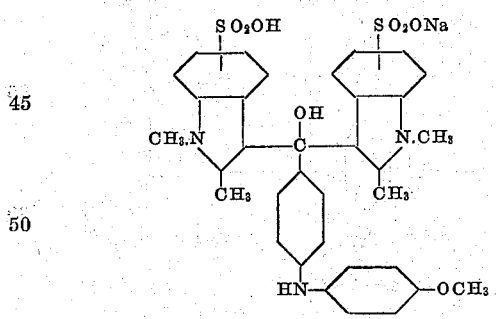

MnO₂ may also be used as an oxidizing agent.

By using in the foregoing examples, instead of para-alkoxy-phenylamines, the corresponding quantity of para-amino-diphenyl ether, dyestuffs of same tints and same fastness properties are obtained.

We claim:

1. The process which comprises condensing one mol of an aldehydo compound of the general formula:

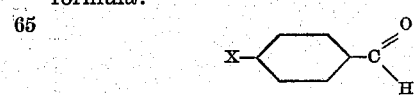

wherein X represents a member of the group consisting of a halogen atom and a sulfo group, with two mols of the sulfonation product of the indole compound of the formula:

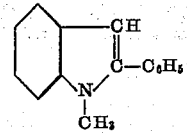

oxidizing the leuco dyestuff sulfonic acid thus obtained to the dyestuff sulfonic acid and reacting the substituent X with a compound of the general formula:

wherein R means a member of the group consisting of methyl, ethyl and phenyl.

2. The process which comprises condensing one mol of para-sulfobenzaldehyde with two mols of the sulfonic acid obtained by treating N-methyl-alpha-phenyl-indole with five times its weight of fuming sulfuric acid containing 20% of sulfuric anhydride at room temperature for about 4 to 5 hours, oxidizing the leuco compound obtained to the dyestuff sulfonic acid and melting it at about 120° C. for several hours with an excess of para-anisidine.

3. The compounds obtained by the process which comprises condensing one mol of an aldehydo compound of the general formula:

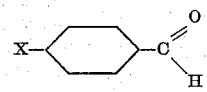

wherein X represents a member of the group consisting of a halogen atom and a sulfo group, with two mols of the sulfonation product of the indole compound of the formula:

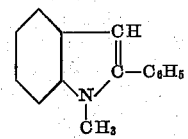

oxidizing the leuco dyestuff sulfonic acid thus obtained to the dyestuff sulfonic acid and reacting the substituent X with a compound of the general formula:

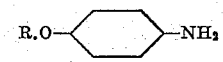

wherein R means a member of the group consisting of methyl, ethyl and phenyl.

4. The compound obtained by the process which comprises condensing one mol of para-sulfobenzaldehyde with two mols of the sulfonic acid obtained by treating N-methyl-alpha-phenyl-indole with five times its weight of fuming sulfuric acid containing 20% of sulfuric anhydride at room temperature for about 4 to 5 hours, oxidizing the leuco compound obtained to the dyestuff sulfonic acid and melting it at about 120° C. for several hours with an excess of para-anisidine.

PAUL WOLFF.
FRIEDRICH HEIM.